(12) United States Patent
Ante et al.

(10) Patent No.: US 9,464,555 B2
(45) Date of Patent: Oct. 11, 2016

(54) METHOD AND SYSTEM FOR AN EXHAUST GAS PARTICULATE FILTER

(71) Applicant: Continental Automotive GmbH, Hannover (DE)

(72) Inventors: Johannes Ante, Regensburg (DE); Marcus Herrmann, Regensberg (DE); Willibald Reitmeier, Hohenschambach (DE); Denny Schaedlich, Neustadt (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 14/357,598

(22) PCT Filed: Nov. 7, 2012

(86) PCT No.: PCT/EP2012/071969
§ 371 (c)(1),
(2) Date: May 13, 2014

(87) PCT Pub. No.: WO2013/068370
PCT Pub. Date: May 16, 2013

(65) Prior Publication Data
US 2015/0033707 A1    Feb. 5, 2015

(30) Foreign Application Priority Data

Nov. 10, 2011    (DE) .......................... 10 2011 086 118

(51) Int. Cl.
*F01N 9/00* (2006.01)
*F01N 3/023* (2006.01)
*F01N 3/025* (2006.01)

(52) U.S. Cl.
CPC ............... *F01N 9/002* (2013.01); *F01N 3/023* (2013.01); *F01N 3/0253* (2013.01);
(Continued)

(58) Field of Classification Search
CPC ............... F01N 9/002; F01N 2560/05; F01N 2560/06; F01N 2900/1602; F01N 2900/1606; Y02T 10/47
USPC .................................. 60/276, 277, 295, 311
See application file for complete search history.

(56) References Cited

U.S. PATENT DOCUMENTS 7,040,086 B2    5/2006    Kitahara et al. ................. 60/285
7,377,154 B2    5/2008    Berger et al. ............... 73/118.01
(Continued)

FOREIGN PATENT DOCUMENTS

CN    1550646 A    12/2004    ............... F01N 3/02
DE    10341949 A1    4/2005    ............... F01N 11/00
(Continued)

OTHER PUBLICATIONS

International Search Report and Written Opinion, Application No. PCT/EP2012/071969, 16 pages, Mar. 1, 2013.
(Continued)

*Primary Examiner* — Audrey K Bradley
(74) *Attorney, Agent, or Firm* — Slayden Grubert Beard PLLC

(57) ABSTRACT

A system for determining a regeneration phase of an exhaust gas particulate filter for an internal combustion engine may include a temperature sensor for detecting an elevated exhaust gas temperature, a sensor for detecting the particulate content in the exhaust gas stream exiting from the exhaust gas particulate filter, and a processing device for determining the regeneration phase on the basis of the detected values. A method for determining a regeneration phase of an exhaust gas particulate filter for an internal combustion engine may include detecting an elevated exhaust gas temperature, sampling a signal from a sensor for detecting the particulate content in the exhaust gas stream exiting from the exhaust gas particulate filter, detecting that the particulate content is elevated, and determining the regeneration phase.

4 Claims, 3 Drawing Sheets

(52) U.S. Cl.
CPC ...... *F01N 2560/05* (2013.01); *F01N 2560/06* (2013.01); *F01N 2900/1602* (2013.01); *F01N 2900/1606* (2013.01); *Y02T 10/47* (2013.01)

(56) References Cited

U.S. PATENT DOCUMENTS

| | | | |
|---|---|---|---|
| 7,572,305 B2 | 8/2009 | Wirth et al. | 55/282.3 |
| 2008/0048681 A1 | 2/2008 | Birkhofer et al. | 324/693 |
| 2009/0133387 A1* | 5/2009 | Nishizawa et al. | 60/286 |
| 2009/0301062 A1 | 12/2009 | Sumida et al. | 60/285 |
| 2010/0049462 A1 | 2/2010 | Krafthefer et al. | 702/104 |
| 2013/0090866 A1* | 4/2013 | Ante et al. | 702/35 |

FOREIGN PATENT DOCUMENTS

| | | | |
|---|---|---|---|
| DE | 102004007038 A1 | 9/2005 | F02N 11/00 |
| DE | 102005034247 A1 | 1/2007 | F01N 11/00 |
| DE | 102009026753 A1 | 12/2009 | F01N 11/00 |
| DE | 102010006708 A1 * | 8/2011 | F01N 11/00 |
| WO | 2013/068370 A1 | 5/2013 | F01N 11/00 |

OTHER PUBLICATIONS

Chinese Office Action, Application No. 201280055210.X, 13 pages, Oct. 21, 2015.

* cited by examiner

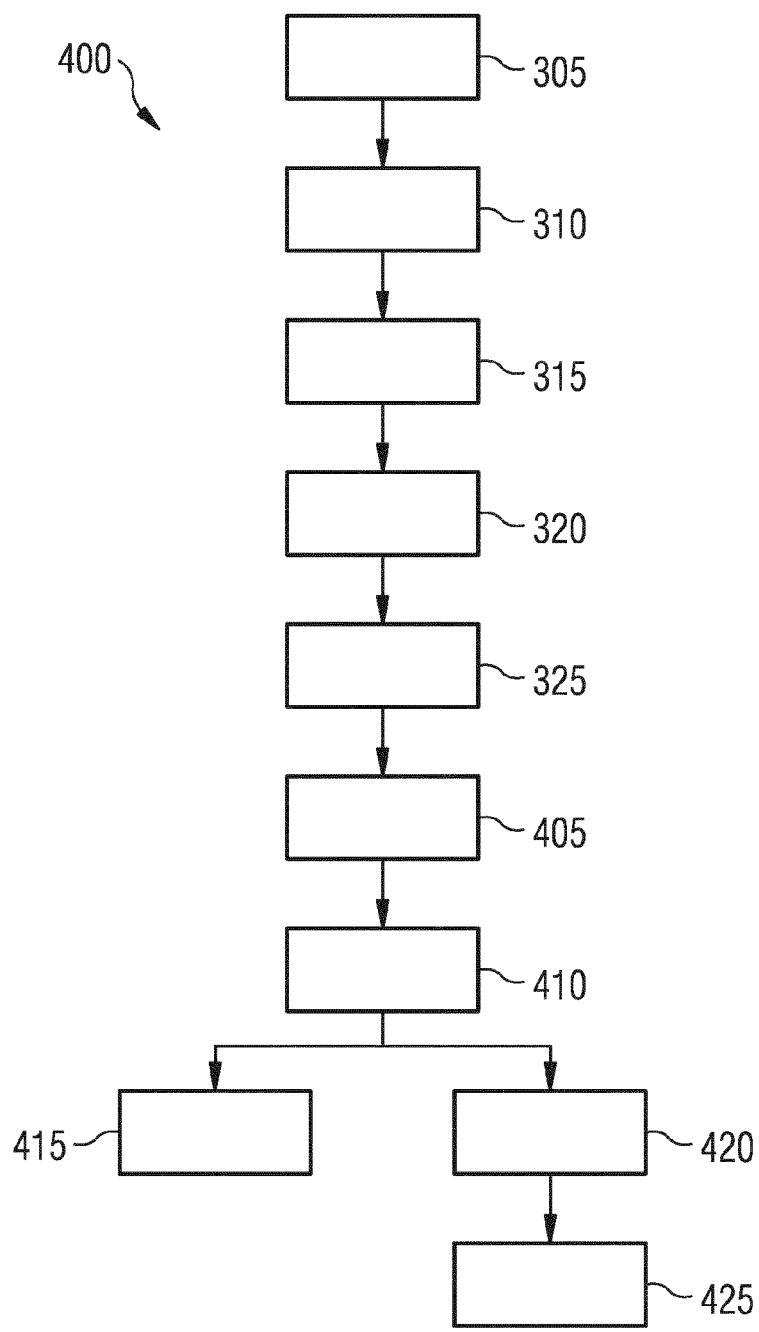

METHOD AND SYSTEM FOR AN EXHAUST GAS PARTICULATE FILTER

CROSS-REFERENCE TO RELATED APPLICATIONS

This application is a U.S. National Stage Application of International Application No. PCT/EP2012/071969 filed Nov. 7, 2012, which designates the United States of America, and claims priority to DE Application No. 10 2011 086 118.1 filed Nov. 10, 2011, the contents of which are hereby incorporated by reference in their entirety.

TECHNICAL FIELD

The invention concerns a method and a system with the features of the independent claims. In particular the invention concerns a method and a system for operation of an exhaust gas particulate filter for a motor vehicle.

BACKGROUND

Motor vehicles fitted with a diesel engine are increasingly being equipped with a particulate filter to retain the soot particulates which can be produced on combustion of diesel fuel. Often a wall stream filter is used to remove the particulates from the exhaust gas stream from the internal combustion engine. To remove the filtered soot particulates from the wall stream filter again, it is necessary to regenerate the particulate filter.

Wall stream filters which are coated for example with cordierite or silicon carbide (SiC) allow a catalytically supported regeneration. The regeneration can firstly take place passively if the exhaust gas and hence the filter reach a sufficiently high temperature, which can for example occur on predominantly highway use of the motor vehicle. Secondly, if the motor vehicle is operated only under a low load for a lengthy period, an active regeneration can be triggered in which fuel is injected into the exhaust gas and combusted in order to raise its temperature.

DE 10 2009 026 753 A1 indicates an exhaust gas control device for an internal combustion engine which supports a particulate filter of the type described.

SUMMARY

One embodiment provides a method for determining a regeneration phase of an exhaust gas particulate filter for an internal combustion engine, with the following steps: detection of an elevated exhaust gas temperature; sampling of a signal from a sensor for detecting the particulate content in the exhaust gas stream emerging from the exhaust gas particulate filter; detection that the particulate content is increased; and determination of the regeneration phase.

In a further embodiment, the method further comprises a detection of a reversal of the increase in the particulate content in the exhaust gas stream emerging from the exhaust gas particulate filter within a predefined time interval following the increase.

In a further embodiment, the method further comprises the step of termination of an injection of fuel into the exhaust gas stream in order to end an excitation of the exhaust gas particulate filter for regeneration.

In a further embodiment, the method further comprises the step of determination of a fault in the sensor if the sensor signal does not correspond to a change in a combustion state of the internal combustion engine.

Another embodiment provides a method for controlling an internal combustion engine with an exhaust gas particulate filter, comprising the following steps: determination of a regeneration phase of the exhaust gas particulate filter by means of a method as disclosed above; determination of a first particulate content of the exhaust gas stream entering the exhaust gas particulate filter, on the basis of an operating model for the internal combustion engine; determination of a second particulate content of the exhaust gas stream emerging from the exhaust gas particulate filter, on the basis of the first particulate content and a retention power of the exhaust gas particulate filter which is reduced during the regeneration phase; and plausibility check of a parameter of the operating model in relation to the sensor signal on the basis of a comparison of the sensor signal with the determined second particulate content.

In a further embodiment, a fault in the sensor is determined if the sensor signal does not correspond to the determined second particulate content.

In a further embodiment, the method further comprises an adaptation of the parameter.

Another embodiment provides a method for controlling an internal combustion engine with an exhaust gas particulate filter, comprising the following steps: determination of a regeneration phase of the exhaust gas particulate filter by means of a method as disclosed above; and determination of a particulate content of the exhaust gas stream entering the exhaust gas particulate filter, on the basis of the sensor signal and a retention power of the exhaust gas particulate filter which is reduced during the regeneration phase.

Another embodiment provides a computer program product with program coding means for performance of one of the methods disclosed above, when the computer program product runs on a processing device or is stored on a computer-legible data carrier.

Another embodiment provides a system for determining a regeneration phase of an exhaust gas particulate filter for an internal combustion engine, comprising: a temperature sensor for detecting an elevated exhaust gas temperature; a sensor for detecting the particulate content in the exhaust gas stream emerging from the exhaust gas particulate filter; and a processing device for determining the regeneration phase on the basis of the values detected.

BRIEF DESCRIPTION OF THE DRAWINGS

Example embodiments of the invention are described in more detail below with reference to the figures, in which:

FIG. 4 shows a process diagram of a second method.

DETAILED DESCRIPTION

Figure 1:
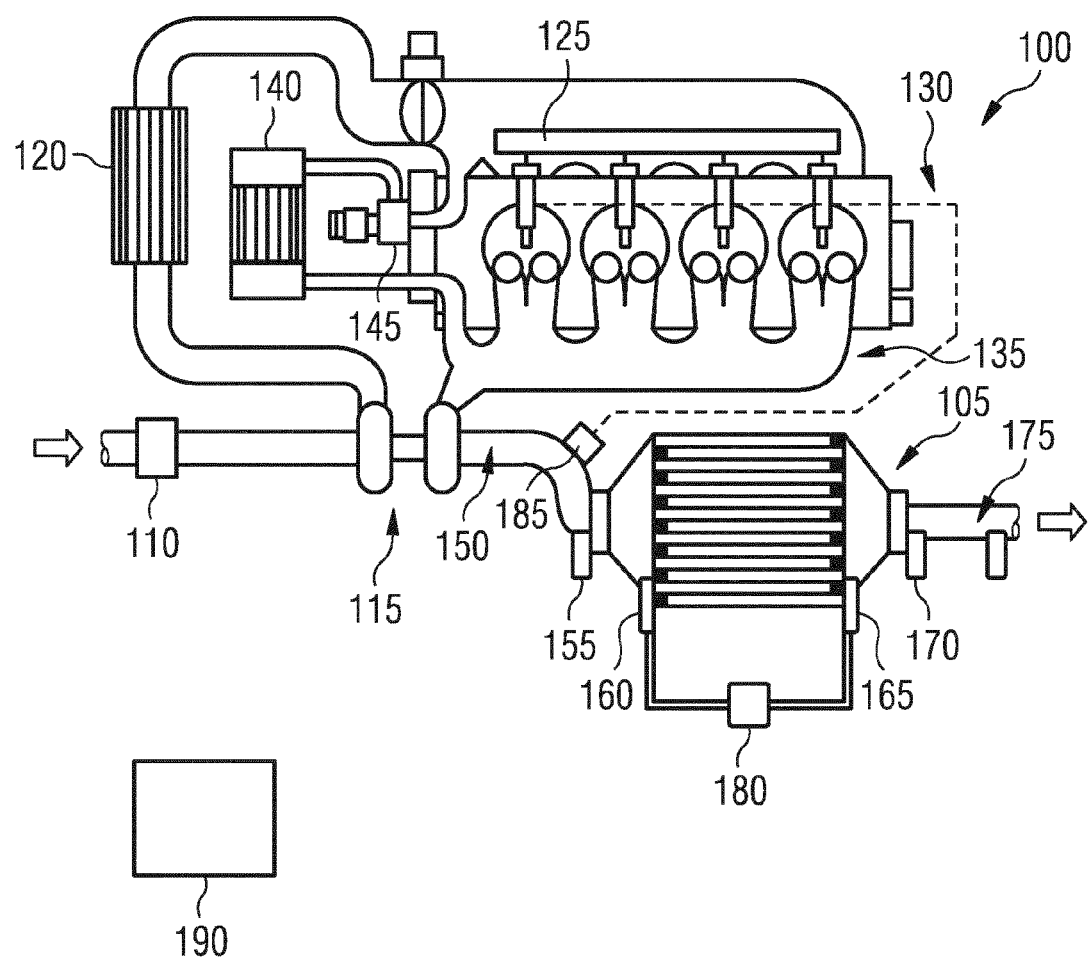
FIG. 1 shows an internal combustion engine with exhaust gas particulate filter.

Embodiments of the invention provide a method and a system for improved operation of a regeneratable particulate filter for an internal combustion engine.

One embodiment provides a method for determining a regeneration phase of an exhaust gas particulate filter for an internal combustion engine comprises the steps of detection of an elevated exhaust gas temperature, sampling of a signal from a sensor for detecting the particulate content in the exhaust gas stream emerging from the exhaust gas particulate filter, detection that the particulate content is increased, and determination of the regeneration phase.

During the catalytically supported regeneration of a particulate filter, in particular a diesel soot particulate filter with cordierite coating, a temperature of the filter is characteristically high, so that from this temperature, a regeneration phase can be concluded. Towards the end of the regeneration phase, a filter power of the particulate filter is reduced so that soot particulates can be found in the exhaust gas stream emerging from the particulate filter. This is called "soot slip". Depending on the raw emission of the internal combustion engine, a concentration of particulates in the exhaust gas is then approximately 0-10 mg per cubic meter. By considering both the temperature and the particulate content in the emerging exhaust gas stream, the regeneration phase or its end can be determined with greater certainty and good temporal resolution. This determination can advantageously be used for diagnostic purposes and to control an operation of both the internal combustion engine and of the particulate filter. For example, this can facilitate a check of the ash loading of the particulate filter.

In one embodiment, a reversal of the increase in the particulate content in the exhaust gas stream emerging from the exhaust gas particulate filter is detected within a predefined interval following the increase. Within around 10 minutes, the increase should have fallen back to approximately zero. By observing this criterion, the determination of the regeneration phase can be established with further improved accuracy and quality.

For example the method can be used to terminate an active regeneration of the exhaust gas particulate filter. For this, after determining the end of the regeneration phase, the injection of fuel into the exhaust gas stream to excite the exhaust gas particulate filter to regeneration may be terminated. The injection of fuel can thus be carried out at a time at which the regeneration has actually been completed. The interval during which fuel is injected can thus be shortened and fuel can be saved. In this way the environmental load from the injected fuel can be kept low.

In a further embodiment, on the basis of determination of the regeneration phase, it can be determined whether the sensor for the particulate content has a fault. For example while the particulate content is increased, because the filter power of the exhaust gas particulate filter is reduced towards the end of the regeneration phase, a combustion state of the internal combustion engine can be changed in order to vary the content of particulates in the exhaust gas stream entering the exhaust gas particulate filter. If the sensor signal does not follow this variation or only follows it inadequately, a sensor fault can be concluded.

It can also be determined that the exhaust gas particulate filter has a fault if the elevated temperature and an increased particulate content can indeed be detected but the particulate content does not fall to a value close to zero within the predefined interval.

By the improved diagnosis of the sensor or exhaust gas particulate filter, an improved function check of a motor vehicle with internal combustion engine and exhaust gas particulate filter can be carried out. The emissions from the motor vehicle or its internal combustion engine can be kept low, whereby the environmental load can be reduced.

The determined regeneration phase can also be used for improved operation of the internal combustion engine. In a further embodiment, a first particulate content of the exhaust gas stream entering the exhaust gas particulate filter is determined on the basis of an operating model for the internal combustion engine, and a second particulate content of the exhaust gas stream emerging from the exhaust gas particulate filter is determined on the basis of the signal from the soot sensor. In the knowledge of the reduced filter power of the exhaust gas particulate filter, the particulate contents or emissions determined can be compared. The determined emissions can correspond to each other if a predictable raw emission, which would be expected under the reduced retention power on the basis of the second particulate content, corresponds to the first particulate content.

A parameter of the operating model can thus be checked for plausibility in relation to the sensor signal. Thus the operating model or its parameter can be checked so that the plausibility or reliability of the operating model can be increased.

In one embodiment, a parameter of the operating model can be adapted in order to reduce a difference between the expected raw emission and the first particulate content. In this way the operating model of the internal combustion engine can be improved, so that the combustion state of the internal combustion engine can be controlled better in order to achieve a more efficient combustion or lower emission of particulates in the exhaust gas stream.

Conversely, a sensor fault can also be determined if the predicted raw emission does not correspond to the determined second particulate content. Thus a diagnosis of the sensor can be carried out without having to insert additional components in the region of the internal combustion engine or exhaust gas particulate filter.

In a variant of the method, on the basis of the determined regeneration phase of the exhaust gas particulate filter, a raw emission of the internal combustion engine can be determined. The raw emission, i.e. the particulate content of the exhaust gas stream entering the exhaust gas particulate filter, is determined for this on the basis of the sensor signal and a retention power of the exhaust gas particulate filter which is reduced during the regeneration phase. Thus the regeneration phase of the exhaust gas particulate filter can be used to carry out a determination of the raw emission based on measurement instead of on a model. The determined raw emission may be used to optimize the combustion state of the internal combustion engine in the sense of an improved power output or a reduced emission of exhaust gas particulates.

The method and procedure described may be expressed by a computer program product with program coding means. The computer program product can run on a processing device or be stored on a computer-legible data carrier.

The disclosed system for determining a regeneration phase of an exhaust gas particulate filter for an internal combustion engine comprises a temperature sensor for detecting an elevated exhaust gas temperature, a sensor for detecting the particulate content in the exhaust gas stream emerging from the exhaust gas particulate filter, and a processing device for determining the regeneration phase on the basis of the values detected.

The system is advantageously used to control and monitor the internal combustion engine or the exhaust gas particulate filter.

FIG. 1 shows an internal combustion engine 100 with an exhaust gas particulate filter 105. The internal combustion engine 100 is preferably a diesel engine and in the embodiment shown has a number of ancillaries which are not absolutely essential for the function of the exhaust gas particulate filter 105.

Fresh air enters via an intake channel 110 and is compressed in a compression stage of a turbocharger 115. The compressed air is cooled in an intermediate cooler 120 before being supplied to the internal combustion engine 100.

In the internal combustion engine 100, the supplied air is mixed with fuel 130 by means of an injection system 125 and brought to combustion. Exhaust gas produced during combustion emerges via an exhaust tract 135. Part of the exhaust gas is cooled by means of an exhaust gas cooler 140 and mixed with the air supplied to the internal combustion engine 100 by means of an exhaust gas recirculation valve 145. The remaining exhaust gas is conducted to a pump stage of the turbocharger 115.

The exhaust gas 150 emerging from the turbocharger 115 is conducted to the exhaust gas particulate filter 105. The exhaust gas particulate filter 105 is preferably designed for catalytically supported regeneration and is catalytically coated, preferably with cordierite or silicon carbide. In the exhaust gas particulate filter 105, particulates are removed from the exhaust gas 150 emerging from the internal combustion engine 100.

The removed particulates must be removed from the exhaust gas particulate filter 105 at regular intervals. To control this process, a number of sensors can be arranged on the exhaust gas particulate filter 105 and used to control a regeneration phase. In the view shown in FIG. 1, a temperature sensor 155 and a first pressure sensor 160 are arranged in the intake region of the exhaust gas particulate filter 105. A second pressure sensor 165 and a so-called soot sensor 170 for detecting a particulate content in the exhaust gas stream 175 emerging from the exhaust gas particulate filter 105 are arranged in an outlet region of the exhaust gas particulate filter 105. The temperature sensor 155 can also be arranged in the outlet region or between the inlet and outlet regions of the exhaust gas particulate filter 105. A pressure differential between the inlet and outlet sides of the exhaust gas particulate filter 105 is determined by means of a difference sensor 180.

Also a fuel injection system 185 is provided in a region between the internal combustion engine 100 and the exhaust gas particulate filter 105, in order to raise the temperature of the exhaust gas 150 and thus allow active regeneration of the exhaust gas particulate filter 105. A passive regeneration can take place if the internal combustion engine 100 is operated with sufficient load so that the exhaust gas 150 also heats the exhaust gas particulate filter 105 to a temperature necessary for regeneration without the additional injection of fuel.

In order to control in particular the active regeneration of the exhaust gas particulate filter 105, a control device 190 is provided, the connections from which to the sensors 155 to 170 and 180 are not shown for reasons of clarity. In some embodiments, the control device 190 is also designed to control further operating states of the exhaust gas particulate filter 105. In yet a further embodiment, the control device 190 is also designed to control a combustion state of the internal combustion engine 100. For this the control device 190 may be connected to further measuring elements and actuators, both shown and not shown, on the internal combustion engine 100.

The control device 190 is designed in particular to determine, on the basis of the temperature detected by the temperature sensor 155 and of a particulate content in the exhaust gas 175 detected by the soot sensor 170, when a regeneration phase of the exhaust gas particulate filter 105 has taken place or concluded.

Figure 2:
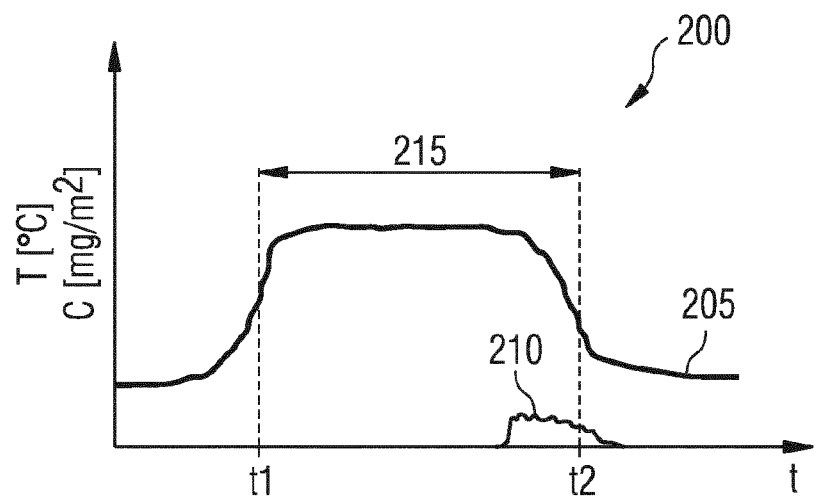
FIG. 2 shows the temporal developments of a temperature and a particulate emission on the exhaust gas particulate filter of FIG. 1.

FIG. 2 shows a diagram 200 with temporal developments of values at the exhaust gas particulate filter 105 from FIG. 1. The horizontal direction shows a time and the vertical direction shows qualitatively a temperature and a particulate content.

A first curve of a temperature of 205 relates to the temperature of the exhaust gas particulate filter 105. A second curve of a particulate content 210 relates to the mass of particulates present in a predefined volume of exhaust gas 175 emerging from the exhaust gas particulate filter 105.

Between a time t1 and a time t2, a regeneration phase 215 of the exhaust gas particulate filter 105 takes place. The regeneration phase 215 can take place passively in normal operation of the internal combustion engine 100, or actively by injection of fuel by means of the fuel injection system 185.

During the regeneration phase 215, the temperature 205 of the exhaust gas particulate filter 105 is elevated i.e. lies perceptibly above a value which predominates outside the regeneration phase 215.

The regeneration phase 215 normally requires an exhaust gas temperature in the range from around 500-550° C. At low load, the internal combustion engine 100 can however reach substantially lower exhaust gas temperatures of around 200° C., so the regeneration of the exhaust gas particulate filter 105 cannot take place. Secondly, the exhaust gas temperature at nominal power output by the internal combustion engine 100 can reach values of around 700-800° C., so that regeneration can take place for the duration of such a load. The exhaust gas temperature alone cannot serve, or can only poorly serve, to indicate whether regeneration has completely concluded.

Outside the regeneration phase 215, the particulate content 210 has a very low value close to zero. Only shortly before the end of the regeneration phase 215 does the particulate content 210 rise, and falls again after around 10 minutes to the old value close to zero. Depending on a particulate content in the exhaust gas 150 supplied to the exhaust gas particulate filter 105, the rise can be as much as 10 mg per cubic meter of exhaust gas 175 emerging from the exhaust gas particulate filter 105.

The regeneration phase 215 or its end can be determined from the rise in particulate content 210 while the temperature 205 is elevated. On the basis of this determination, various functions on the internal combustion engine 100 or on the exhaust gas particulate filter 105 can be controlled in an improved manner.

Figure 3:
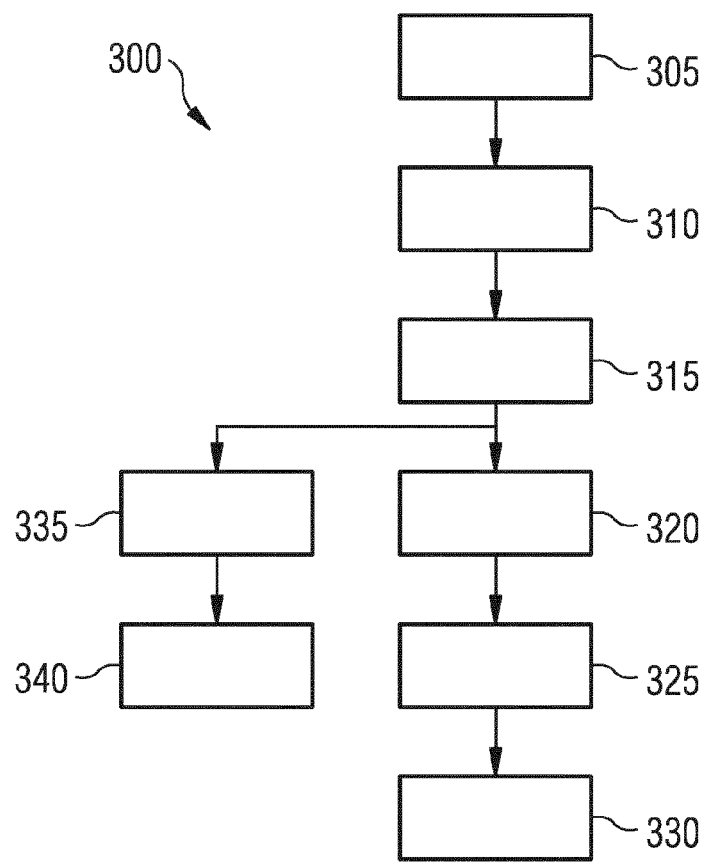
FIG. 3 shows a process diagram of a first method.

FIG. 3 shows a process diagram 300 of a first method. The method 300 comprises several variants, using which it will be demonstrated below which determination and control processes on the internal combustion engine 100 or on the exhaust gas particulate filter 105 from FIG. 1 can be carried out on the basis of the correlations shown in FIG. 2. The method 300 is intended in particular for performance on the control device 190 from FIG. 1.

In a first step 305, an elevated exhaust gas temperature 205 is determined. Depending on the position of the temperature sensor 155, the detected temperature may relate to the incoming exhaust gas 150, the outgoing exhaust gas 175 or the exhaust gas inside the exhaust gas particulate filter 105.

Then in a step 310, a signal from the soot sensor 170 is detected which relates to the particulate content 210 of the outgoing exhaust gas 175.

In a step 315, on the basis of this signal, a rise in the particulate content 210 in the outgoing exhaust gas 175 is detected. The rise is associated with a reduced retention power of the exhaust gas particulate filter 105. The rise in particulate content 210 indicates a start of the regeneration phase 215 of the exhaust gas particulate filter 105.

In a step 320, the method then waits until the particulate content 210 has fallen again. The step 320 can be used for diagnosis of the exhaust gas particulate filter 105. If the particulate content 210 does not fall back to a value close to zero within a predefined time, normally around 10 minutes, a fault of the exhaust gas particulate filter 105 can be assumed. The method 300 may be terminated in this case.

Otherwise in a step 325, on the basis of the fall in the particulate content 210, it is determined that the regeneration phase 215 is concluded.

When the end of the regeneration phase 215 has been determined, in an optional step 330 a fuel injection into the exhaust tract of the internal combustion engine 100 may be terminated if this was carried out for active initiation of the regeneration phase 215.

In another variant of the method 300, the function of the soot sensor 170 can be checked during the regeneration phase 215. For this in a step 335, following step 315 in which an increased particulate content 210 was determined, a combustion state of the internal combustion engine 100 is changed in order to vary a particulate content or a temperature of the incoming exhaust gas 150. A subsequent step 340 then checks whether the particulate content 210 detected by means of the soot sensor 170 reflects this change. If it does not, a faulty soot sensor 170 can be assumed.

FIG. 4 shows a process diagram of a further method 400, using which further procedures will be described, which can be carried out on the internal combustion engine 100 or the exhaust gas particulate filter 105 from FIG. 1, on the basis of determination of the regeneration phase 215. The introductory steps 305 to 325 are taken from the method 300 described above.

In a step 405, a raw emission of the internal combustion engine 100 is determined. The raw emission corresponds to the particulate content in the exhaust gas 150 which emerges from the internal combustion engine 100 and enters the exhaust gas particulate filter 105. The raw emission is determined on the basis of an operating model of the internal combustion engine 100. Operating parameters of the internal combustion engine 100 are used to determine a value for the raw emission from the internal combustion engine 100 using a computer model. In an alternative embodiment, a further soot sensor 170 (not shown in FIG. 1) is provided in the region of the exhaust gas stream 150 entering the exhaust gas particulate filter 105, and the raw emission is determined on the basis of the sensor signal from the further soot sensor 170.

In a subsequent step 410, the emission of the exhaust gas stream 175 emerging from the exhaust gas particulate filter 105 is determined on the basis of the sensor signal from the soot sensor 170. The order of steps 410 and 415 may also be changed.

The two emissions determined in steps 405 and 410 can now be compared with each other.

In a first variant of the method 400, in a step 415 it is determined that the soot sensor 170 has a fault if the two emission values do not correspond to each other. For this it can be determined which raw emission is to be expected, on the basis of the signal from the soot sensor 170 in the knowledge of the reduced retention power of the exhaust gas particulate filter 105, and whether this raw emission corresponds to the raw emission determined in step 405. Since the exhaust gas particulate filter 105 only releases particulates into the outgoing exhaust gas 175 between the rise and subsequent fall of the particulate content 210, the determination described is possible only in this time interval.

In a second variant of the method 400, in a step 420 a parameter of the operating model step 405 is changed, in order to adapt the operating model such that the emission values correspond to each other as described above.

Then in a step 425, the internal combustion engine 100 can be controlled using the improved operating model. Advantageously the method 400 is executed cyclically in order to be able to improve the operating model continually. The methods explained with reference to FIGS. 3 and 4 can also be combined with each other to draw multiple benefits from the values determined.

What is claimed is:

1. A method for operating an exhaust gas particulate filter for an internal combustion engine, comprising:
   sampling a signal from a sensor for detecting particulate content in an exhaust gas stream emerging from the exhaust gas particulate filter;
   detecting that the particulate content is increased;
   injecting fuel into a gas stream upstream of the exhaust gas particulate filter and combusting the fuel to elevate a temperature of the exhaust gas particulate filter; and
   monitoring the signal from the sensor for a predefined time interval following the injection of fuel into the upstream gas stream to control a duration of the fuel injection.

2. The method of claim 1, further comprising:
   detecting a reversal of the increase in the particulate content in the exhaust gas stream emerging from the exhaust gas particulate filter within a predefined time interval following the increase; and
   terminating the injection of fuel into the upstream gas stream in response to the reversal of the increase in the particulate content.

3. The method of claim 1, further comprising:
   detecting a continued increased particulate content in the exhaust gas stream emerging from the exhaust gas filter throughout the predefined time interval following the injection of fuel into the upstream gas stream;
   terminating an injection of fuel into the upstream gas stream to end an excitation of the exhaust gas particulate filter for regeneration; and
   generating a filter fault signal indicating a failure in the exhaust gas particulate filter.

4. An internal combustion engine comprising:
   at least one combustion chamber;
   an exhaust gas particulate filter disposed in an exhaust gas stream exiting the at least one combustion chamber;
   a temperature sensor configured to detect an exhaust gas temperature;
   a sensor configured to detect a particulate content in the exhaust gas stream emerging from the exhaust gas particulate filter;
   a fuel injector disposed to inject fuel into the exhaust gas stream before entering the exhaust gas particulate filter; and
   a processing device configured to:
   sample a signal from the particulate sensor;
   detect that the particulate content is increased;
   activate the fuel injector to inject fuel into the exhaust gas stream upstream of the exhaust gas particulate filter and combust the fuel to elevate a temperature of the exhaust gas particulate filter; and
   monitor the signal from the sensor for a predefined time interval following the injection of fuel into the exhaust gas stream to control a duration of the fuel injection.

\* \* \* \* \*